United States Patent [19]
Peavey

[11] Patent Number: 5,031,718
[45] Date of Patent: Jul. 16, 1991

[54] METHOD AND APPARATUS FOR GENERATING SEISMIC ENERGY IN TRANSITION ZONES

[75] Inventor: Johnny G. Peavey, Kingwood, Tex.

[73] Assignee: Exxon Production Research Company, Houston, Tex.

[21] Appl. No.: 122,587

[22] Filed: Nov. 17, 1987

Related U.S. Application Data

[63] Continuation of Ser. No. 825,504, Feb. 3, 1986, abandoned.

[51] Int. Cl.$^5$ .............................................. G01V 1/04
[52] U.S. Cl. ...................................... 181/114; 181/401
[58] Field of Search ................... 367/14, 15, 141, 142, 367/143, 189, 190; 181/101, 102, 106, 110, 113, 114, 118, 119, 120, 121, 400, 401, 402

[56] References Cited

U.S. PATENT DOCUMENTS

| | | | |
|---|---|---|---|
| 3,164,799 | 1/1965 | Minasian | 181/401 X |
| 3,365,019 | 1/1968 | Bays | 181/120 |
| 3,572,462 | 3/1971 | Gray | 181/110 |
| 3,583,766 | 6/1971 | Padberg, Jr. | 181/106 |
| 3,685,608 | 8/1972 | Hamilton | 181/114 X |
| 4,016,951 | 4/1977 | Dick et al. | 181/110 X |
| 4,139,074 | 2/1979 | White | 181/114 X |
| 4,372,420 | 2/1983 | White | 181/110 X |
| 4,442,916 | 4/1984 | Fair | 181/114 X |
| 4,484,656 | 11/1984 | Bird | 181/114 |
| 4,492,285 | 1/1985 | Fair et al. | 181/114 |
| 4,616,348 | 10/1986 | Ostrander | 367/15 |
| 4,730,692 | 3/1988 | Fair et al. | 181/114 |

FOREIGN PATENT DOCUMENTS

| | | | |
|---|---|---|---|
| 944472 | 3/1974 | Canada | 181/113 |
| 2832078 | 1/1980 | Fed. Rep. of Germany | 181/119 |
| 900234 | 1/1982 | U.S.S.R. | 181/114 |
| 0995043 | 2/1983 | U.S.S.R. | 181/114 |
| 1122992 | 11/1984 | U.S.S.R. | 181/114 |

OTHER PUBLICATIONS

Proubarta, Dolores, Ice Saw-An Incisive Solution to Seismic Noise, Geophysics Re Leading Edge of Exploration 10/85, vol. 4, #10, pp. 18-82.

Primary Examiner—Brian S. Steinberger
Attorney, Agent, or Firm—John S. Schneider; Keith A. Bell

[57] ABSTRACT

Method and apparatus for generating seismic energy in offshore areas includes energy propagating means for directing energy downwardly vertically into an earth formation. A carrier contains an elongated rigid coupler means that extends from the carrier at the water level to the seat floor. A base plate may be connected to the lower end of the coupler means. The coupler means may be a section of pipe. Driving means on the carrier drives the coupler means to cause sound energy to emanate from the coupler means or base plate into the sea floor. Such means may be a hammer-type device or a vibrator-type device. Alternatively, the lower end of the coupler means or the base plate may be driven by means of a vibrator-type device to cause sound waves to emanate from the coupler means or the base plate directly into the sea floor.

13 Claims, 5 Drawing Sheets

METHOD AND APPARATUS FOR GENERATING SEISMIC ENERGY IN TRANSITION ZONES

This application is a continuation application of copending application Ser. No. 825,504, filed on Feb. 3, 1986 now abandoned.

BACKGROUND OF THE INVENTION

Field of the Invention

This invention relates to seismic exploration, and more particularly, to a method and apparatus for transmitting seismic energy directly into the earth or sea floor underlying a body of water.

Poor quality seismic data is often acquired offshore in what is referred to as the transition zone. That zone is an area of nearshore submerged lands, e.g., the coastline out to water depths of approximately sixty feet. The probability of obtaining quality seismic data is worsened when a layer of ice covers the body of water in the transition zone.

Various attempts have been made to reduce the noises that mask the desired seismic signals in gathering seismic data in transition zones. Unfortunately, attempts to attenuate the water column and the ice flexural wave effects have been only partially successful.

The present invention is an alternative energy source for gathering seismic data in the nearshore areas and, particularly, in such areas of the Arctic during the winter. This invention is unique in its ability to eliminate the source generated noise related to the water and any ice layer by lowering the energy source through the water and below the ice layer and coupling the source directly to the sea floor.

SUMMARY OF THE INVENTION

In accordance with the present invention the improved method and apparatus for seismic exploration in transition zones entails generating the seismic energy by lowering elongated, rigid coupler means from the water's surface to the sea floor and then energizing a drive force to drive the coupler means and cause sound waves to emanate from the coupler means into the sea floor. The drive force may be a vibrator-type device or a hammer-type device connected to the coupler means at the water's surface. Alternatively, the drive force may be mounted on the lower end of the coupler means.

If the water area is covered by ice the drive device may be mounted on a vehicle. If there is no ice, the drive device may be mounted on a floating boat or vessel. The vehicle or vessel may be raised onto one or more of the coupler means to utilize the weight or part of the weight of the vehicle or vessel as a hold down or bias system to provide the desired coupling required at the sea bottom coupler means interface.

A base plate may be arranged on the lower end of each coupler means and each base plate may be provided with fold out appendages to expand the surface area of the base plate.

DESCRIPTION OF RELATED ART

U.S. Pat. No. 3,572,462, issued to J. C. Gray, utilizes an explosive energy source inside a bell housing that is lowered to the sea floor on a flexible cable. The present invention does not utilize an explosive source to propagate a wave front. Instead the invention uses conventional vibrator-type or hammer-type sound wave sources. Further, the communication link in the present invention is rigid, which allows for a direct coupling between the energy source and the sea floor. This invention also may use the weight of a vehicle or vessel as a biasing system.

U.S. Pat. No. 4,372,420, issued to A. H. White, uses an array of air guns as the energy source. They are lowered through the ice layer and suspended in the water column. Not only is the source of energy different in this patent, but there is no coupling of the energy source to the sea floor. U.S. Pat. No. 4,016,951, issued to C. W. Dick et al., also has an air gun energy source suspended in the water column.

U.S. Pat. No. 4,484,656, issued to J. M. Bird, discloses seismic vibrators as seismic sources mounted on a truck or vehicle with part of the weight of the vehicle pressing down on the base plate. This vehicle is for land use only and could not be used for work in the transition zone.

U.S. Pat. No. 4,492,285, issued to D. W. Fair, et al., also discloses a truck mounted seismic vibrator system. This system also discloses a vehicle for land use only. No transition zone, ice or marine work is involved in this patent.

DETAILED DESCRIPTION OF THE INVENTION

Figure 1:
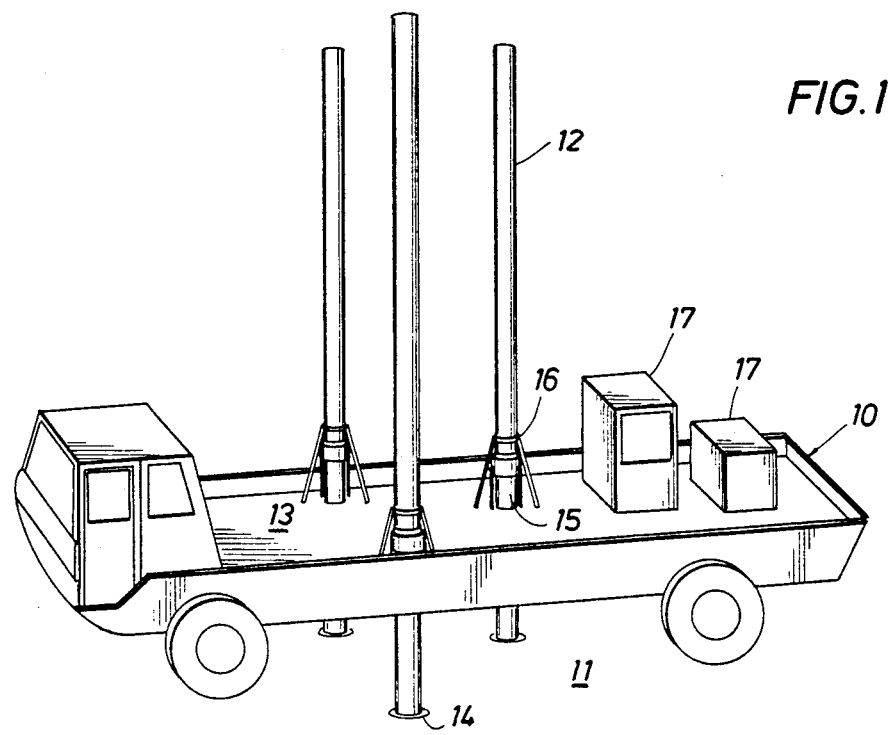
FIG. 1 is a schematic oblique view of one embodiment of the seismic system of the invention.

Referring to FIGS. 1, a seismic truck or vehicle 10 is shown positioned on ice 11 in a nearshore transition zone. Three couplers 12 extend through the bed 13 of truck 10 and through holes 14 drilled through ice 11. Coupler 12 may suitably be a section of pipe, as shown, or the coupler may be any slender or elongated rigid means hollow or solid and of any desired cross-sectional shape, capable of being hammered or vibrated to impart sound waves, to the sea floor. Coupler drive means for imparting energy to couplers 12 are indicated at 15. Lifting mechanisms for raising truck 10, or a part of truck 10, on couplers 12 are indicated at 16. Power generator units for supplying power to the coupler drive devices and the truck lifting mechanisms are indicated at 17.

Figure 2A:
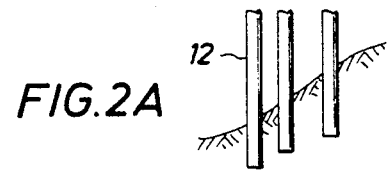
FIG. 2A illustrates the lower ends of modified elongated coupling means.
Figure 2:
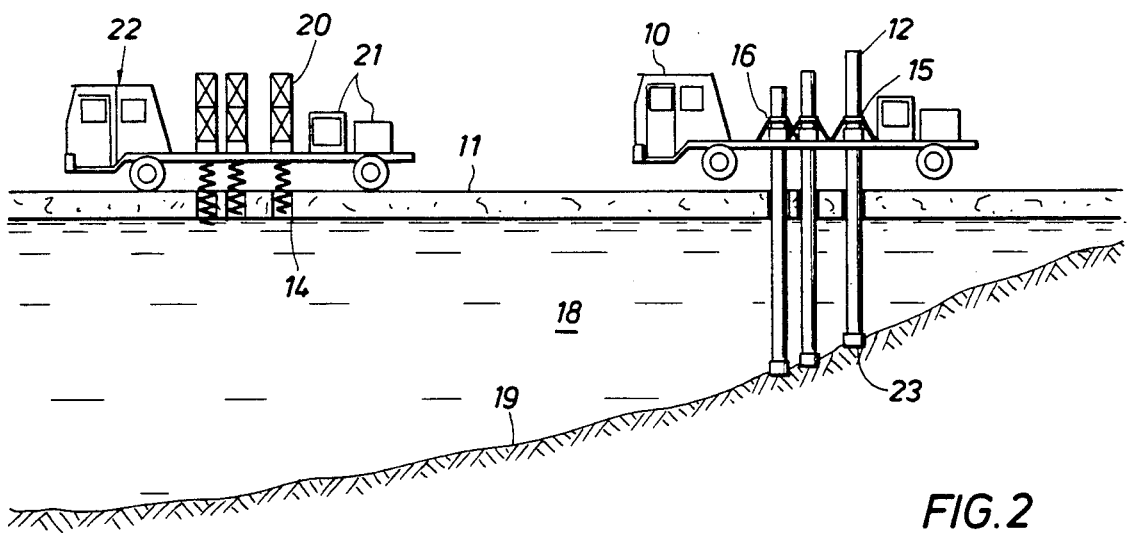
FIG. 2 is a schematic side view of the embodiment of the invention of FIG. 1 and including an illustration of a lead ice penetrating vehicle.

As seen in FIG. 2 the layer of ice 11 covers a body of water 18 that has a sea floor or bottom 19. Holes 14 are drilled in ice 11 by ice drilling equipment 20 powered by power generating units 21 mounted on a lead ice penetrating vehicle 22.

Couplers 12 extend through ice 11 and water 18 to the sea floor 19. The lower end of each coupler 12 contains a base plate 23 that engages sea floor 19. Vehicle 10 is shown lifted off ice 11 and supported on the three couplers 12 by truck lifting mechanisms 16. Couplers 12 are in turn supported on base plates 23. Drive devices 15 impart energy to couplers 12 to cause sound waves to travel down the couplers and through the base plates into the sea floor. Drive devices 15 may, alternatively, be located in each base plate 23. In that arrangement, drive devices 15 impart energy directly to the sea floor through the base plates.

FIG. 2A shows three couplers 12 without base plates 23. These type couplers might be preferred where the sea floor is soft. The lower ends of these couplers are driven into the sea floor, as shown, and then the couplers are vibrated or hammered to impart seismic energy to the sea floor.

Figure 3:
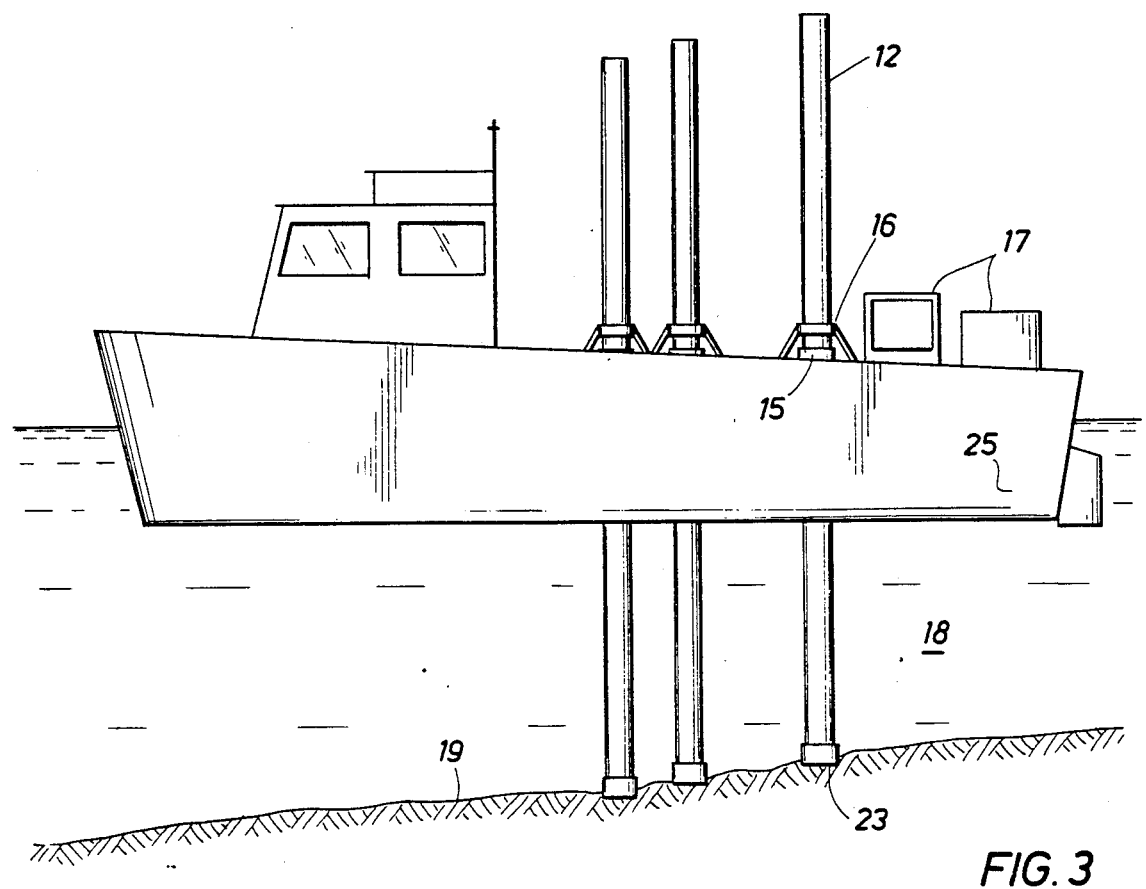
FIG. 3 is a schematic side view of another embodiment of the seismic system of the invention.

In FIG. 3, a boat or vessel 25 is shown positioned in body of water 18 in the transition zone. Vessel 25 contains the same seismic system as contained by vehicle 10 including couplers 12, drive devices 15, truck lifting mechanisms 16, and power generator units 17. Couplers 12 extend through the bottom of boat 25 and through water 18 until base plates 23 engage the sea floor 19. In a manner similar to that illustrated in FIG. 2, all or part of the weight of boat 25 may be supported on couplers 12 and base plates 23.

The couplers may be positioned outside the truck body or outboard the vessel instead of extending through the bed of the truck or hull of the vessel as described and shown.

Figure 4:
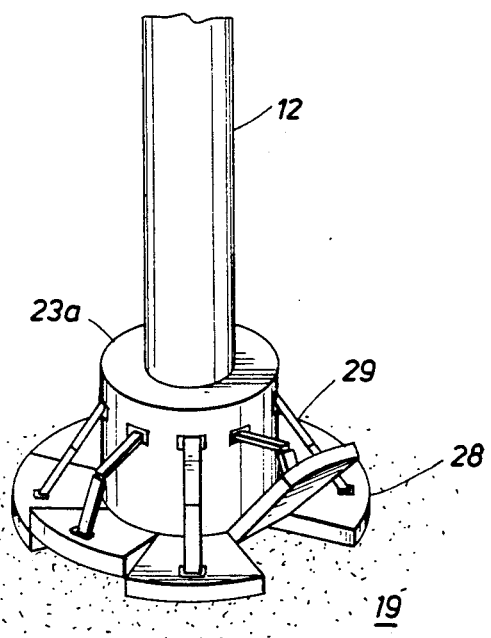
FIG. 4 is a schematic oblique view illustrating fold-out appendages mounted on a base plate.
Figure 8:
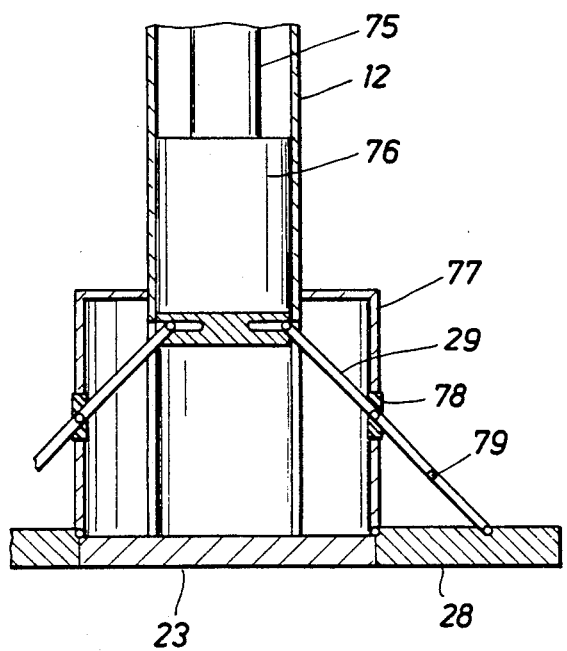
FIGS. 8 and 9 are schematic side views of one way of operating the base plate appendages.
Figure 9:
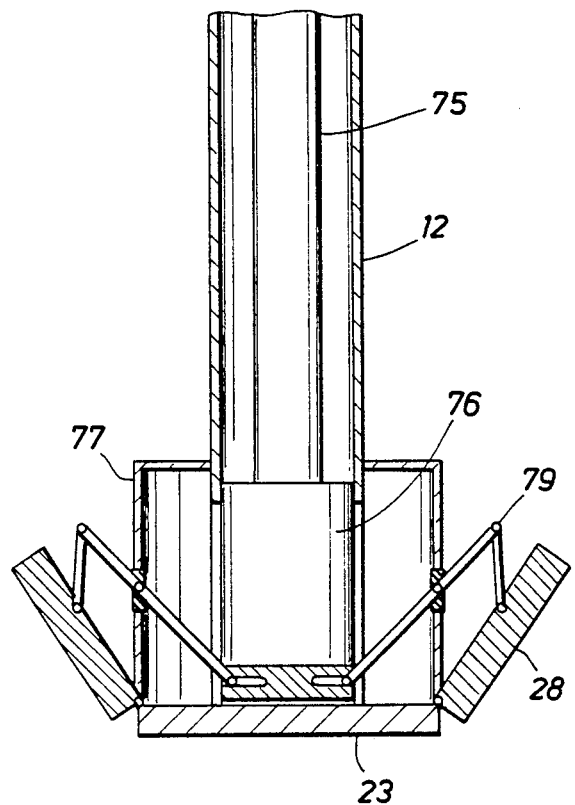
Figure 10:
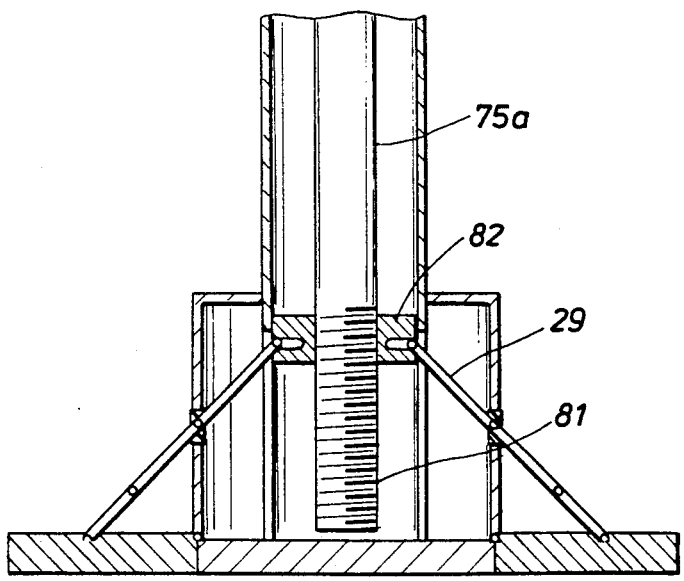
FIG. 10 is a schematic side view showing another way of operating the base plate appendages.

In FIG. 4, a base plate 23a, connected to coupler 12, includes fold out appendages or plates 28 connected to hinged arms 29. Appendages 28, after deployment through openings 14 in the ice layer but before contacting sea floor 19, are folded out to expand the surface area of base plate 23a. Appendages 28 are made rigid in the folded out position and are retracted when couplers 12 and the base plates are raised to the surface of the water. The appendages may be designed to fold out or in, independently or simultaneously. FIG. 4 illustrates individual deployment of the appendages. FIGS. 8, 9, and 10 show two different mechanical techniques for simultaneous deployment of the appendages. The more simplified mechanical motion of the simultaneous operation of the appendages is preferred.

Figure 5:
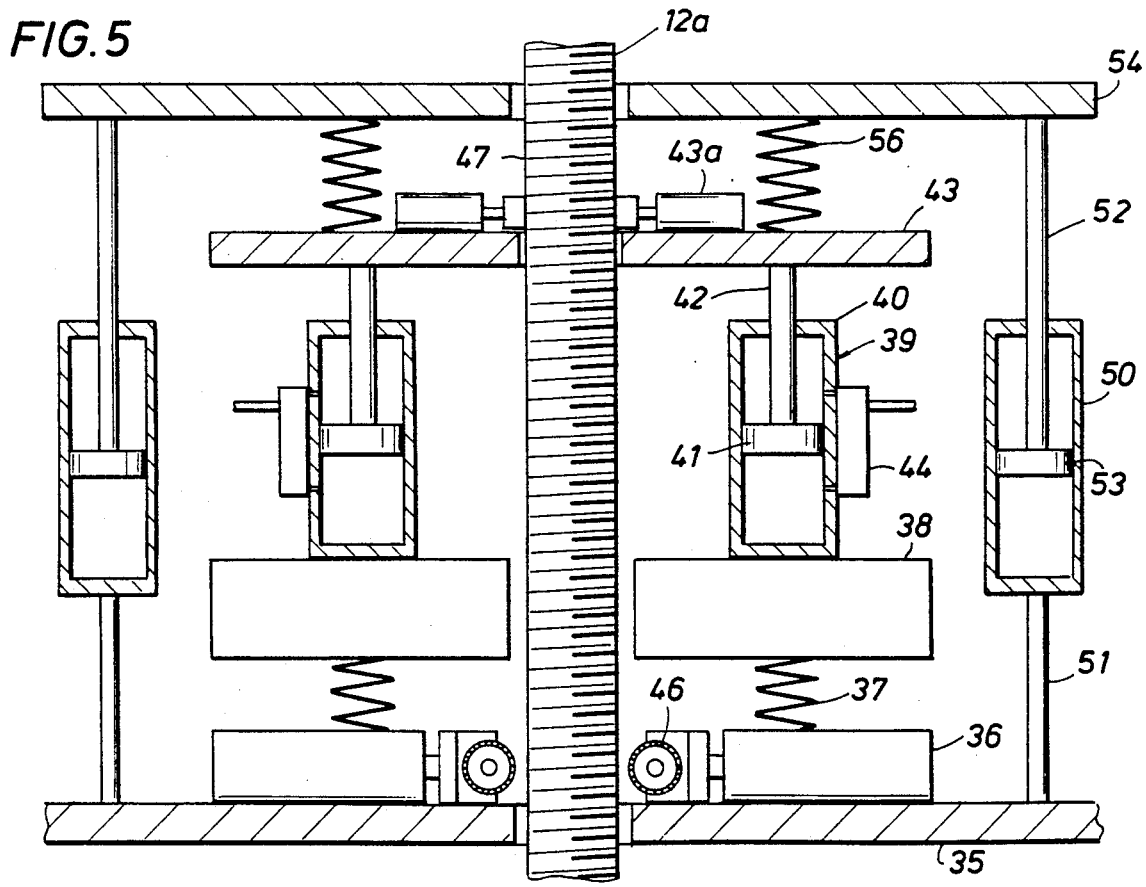
FIG. 5 is a schematic side view illustrating a vibrator type seismic source and a pickup unit to allow the weight of the vehicle or vessel to be placed on the base plate for bias.

FIG. 5 illustrates a typical seismic hydraulic vibrator. Lifting gear boxes 36 are welded or bolted to the truck or vessel bed 35 and are releasably attachable to threaded couplers 12a. Each gear box 36 contains laterally movable wheel gear extension members 46 for engaging the threads 47 on coupler 12a. Mechanical or hydraulic actuators, not shown, may be employed to move members 46 inwardly to engage coupler 12a during deployment or retrieval of coupler 12a and outwardly to retract extension members 46 from coupler 12a during vibration periods. Rotation of wheel gear 46 in one direction moves coupler 12a upwardly and rotation in an opposite direction moves coupler 12a downwardly. Isolation springs 37 support the reaction mass 38 of each hydraulic vibrator 39. In FIG. 5 isolation spring 37 are shown resting on gear boxes 36. They could, of course, rest on the truck or vessel bed 35. The hydraulic vibrators 39 are secured by welding or bolts to reaction masses 38. Each hydraulic vibrator 39 includes a cylinder 40 in which a piston 41 reciprocates. Piston rods 42 are connected to the pistons and to clamp plate 43, that is releasably attachable to coupler 12a. Gear boxes 43a are mounted on clamp plate 43 and each contains a laterally movable clamp extension member for engaging couplers 12 during vibrating periods and for retracting and disengaging from coupler 12 at other times. Gear box 43a and its extension member operate similarly to the operation of gear box 36 and extension member 46 except gear box 36 is retracted when gear box 43a is extended and vice-versa. Servo-valves 44 are mounted on each hydraulic vibrator 39.

Isolation springs 37 are utilized to avoid the transmission of vibrations to the truck or vessel and to support reaction masses 38. The isolation spring system may be dampening springs, hydraulic shock absorbers, isolation air bags, etc. Rod clamp 43 holds couplers 12a rigid to the vibrator unit which is composed of hydraulic vibrators 39, reaction masses 38, and isolation springs 37. The vibration system is electrically actuated by the servo valves 44.

Instead of the wheel gear described and shown, each extension member 46 may be a roller, covered by rubber or the like, designed to grip coupler 12. Further, couplers 12a may be raised and lowered by a crane or derrick-type equipment instead of by means of lifting gear boxes 36.

Also shown in FIG. 5 is a pick-up or lifting unit. Hydraulic cylinders 50 are connected to the truck or vessel bed 35 by rigid rod support members 51. The piston rods 52 are connected at one of their ends to pistons 53 in cylinders 50 and at their other ends are connected to a plate member 54. Rod clamp member 43 is connected to plate support member 54 by isolation springs 56. Furnishing hydraulic fluid to hydraulic cylinders 50 causes pistons 53 and piston rods 52 to move down which carries or raises truck or vessel bed 35 upwardly on couplers 12a. This allows the weight of the vehicle or vessel to be placed on the base plate 23 for bias. All vibrator units utilize this technique to provide a substantial coupling between the ground and the vibrating unit. The pick-up unit is usable with any drive system desired.

Figure 6:
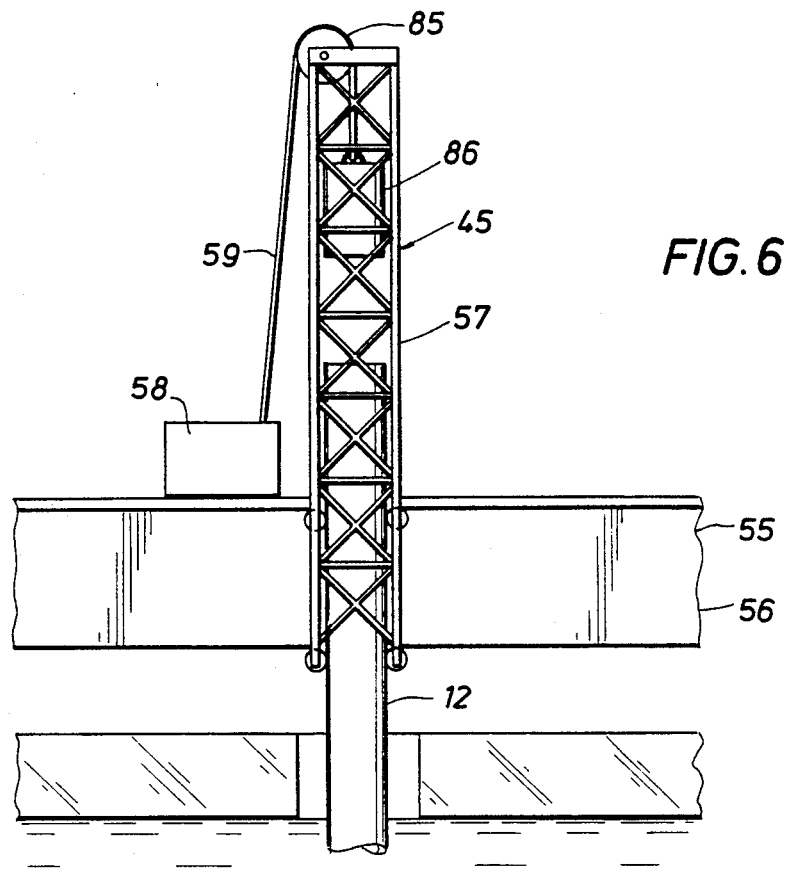
FIG. 6 is a schematic side view illustrating a jackhammer or pile driver seismic source.

FIG. 6 shows a hammer system 45 for imparting seismic energy to the base plate through coupler 12. A lifting gear box 55 raises the bed 56 of the truck or vessel on coupler 12 by means of frame 57. Once supported on coupler 12 by lift gear box 55, the weight of vehicle 10 or vessel 25 provides hold down weight to base plate 23.

The drive system, indicated at 58, is provided with a cable 59 that is connected by way of a pulley 85 to a hammer 86. When hammer 86 is dropped on the upper end of coupler 12, sound waves travel through the length of coupler 12 and through base plate 23 into the sea floor 19.

Figure 7:
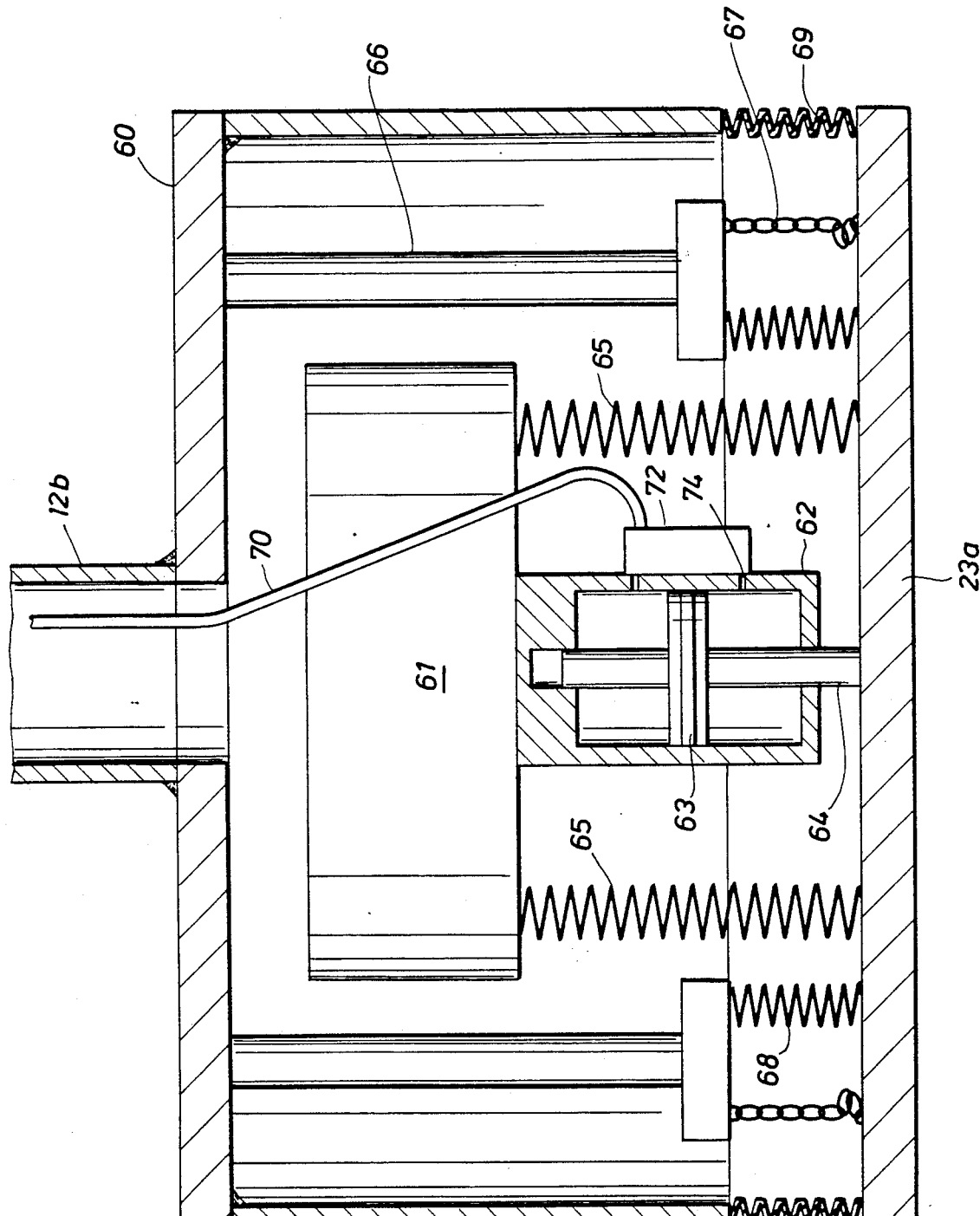
FIG. 7 is a schematic side view illustrating a vibrator-type seismic source positioned in a base plate assembly.

An arrangement in which the vibrator mechanism acts directly on the base plate is illustrated in FIG. 7. The lower end of coupler 12b is connected to a vibrator enclosure housing 60. The vibrator equipment within housing 60 includes a reaction mass 61 mounted on a cylinder 62. A piston 63 attached to a piston rod 64 reciprocates in cylinder 62. Piston rod 64 is connected to base plate 23a. A series of supporting and isolating springs 65 connect reaction mass 61 to base plate 23a. A series of vertical support posts 66 are connected at their upper ends to housing 60; the lower ends being connected to base plate 23a by chains 67 and isolation springs 68. The hold down weight of the vehicle or ship is applied to base plate 23a by coupler 12b, support posts 66 and isolation springs 68. The chains 67 are used to pick up the base plate 23a and vibrator when the unit is not positioned on the sea floor. The lower end of housing 60 is connected to base plate 23a by a flexible partition 69 that seals the interior of housing 60 from the surrounding water. A hydraulic line or hose 70 furnishes high pressure hydraulic fluid from the surface to ports 74 on each side of piston 63. Hose 70 also contains a low pressure hydraulic return line, not shown. Servo valve 72 controls the movement of piston 63 and the resultant vibrations on base plate 23a.

Two types of systems for folding and unfolding base plate appendages 28 are shown in FIGS. 8-10. In FIGS. 8 and 9, a cylindrical rod 75 is connected to an end member 76 within coupler 12. The inner ends of a series of hinged arms 29 are attached to cylinder 76. The housing 77 surrounds base plate 23. Arms 29 extend through grommets 78 formed in the wall of housing 77. When rod 75 is in its upper position shown in FIG. 8, appendage plates 28 are unfolded to extend the area of base plate 23. In that position arms 29 are rigid. When rod 75 and cylinder 76 are moved downwardly to the positions shown in FIG. 9, arms 29 pivot on hinges 79 and cause appendages 28 to fold inwardly.

A similar action takes place in the embodiment shown in FIG. 10. However, in that embodiment rod 75a is threaded at its lower end 81. A vertically movable threaded member 82 is connected to the inner ends of arms 29. Upon rotation of rod 75a, member 82 will move up or down depending upon the direction of rotation of rod 75a, to cause the appendage plates 28 to fold outwardly and inwardly, respectively.

Operation of the appendages may be carried out in other ways-hydraulically, mechanically or electrically.

In an ice arctic environment as shown in FIG. 2, holes are drilled through the layer of ice 11 by drilling equipment 20 on lead vehicle 22. After the desired hole pattern is drilled, e.g., the three holes 14, seismic vehicle 10 is positioned over holes 14, then each coupler 12 having a base plate 23 on its lower end is lowered through each hole 14 until each base plate 23 engages sea floor 19. Vehicle 10 may then be raised onto the three couplers 12 by use of the lift equipment described with respect to FIG. 5. In this manner, the weight of vehicle 10 is utilized as a hold down or biased system to provide the necessary coupling required at the sea bottom 19 and base plates 23. If used, base plate appendages 28 are folded out after deployment through ice 11 and before contacting sea floor 19 to expand the surface area of base plate 23. Base plate appendages 28 are folded inwardly prior to recovery of couplers 12.

In a marine environment, the same operations are performed. The weight of the vessel 25 instead of vehicle 10 is placed on couplers 12.

The vibrator is arranged so that the vehicle or vessel is isolated from the vibrations. The couplers can be lengthened or shortened to accommodate the water depth in which the seismic system is to operate. The drive force is energized to drive the couplers and send out sound waves directly or via base plates 23. The drive system is powered by a self-contained hydraulic system located on the vehicle or vessel. The vibrator drive system may be contained within the base plate assembly as shown in FIG. 7.

Unique features of the seismic system are:

In a shallow water marine environment the sound source is coupled to the sea floor. Such coupling eliminates all effect of the ice and the water column on the transmission of energy from the sound source to the subsurface formations. The weight of the seismic vehicle or vessel is utilized as a bias system to keep the vibrator in close contact with the sea floor. The folding base plate assembly increases the surface area of the base plate while allowing for deployment through a small hole in the ice. The drive mechanism is isolated from the carrier on which it is mounted to permit all the driving force to be transmitted to the base plate. The system can be used in both an ice and a shallow water marine environment.

This seismic system solves numerous problems that occur while employing the currently available seismic source systems. The transition of shallow water arctic regions is a uniquely difficult area to gather high quality seismic data. Such areas represent a vital link to present onshore and offshore data. This system provides a unique and superior alternative to present methods of data gathering. It is a functional tool that can be economically employed without impairing present production rates. It is also versatile and uniquely suited to shallow water operations. This system has an advantage over dynamite in that it results in less impact to the environment and therefore is more readily permitted by state and federal agencies. Further, it eliminates the effect of the water column. This system is cost effective compared to dynamite because the production rates are high and the costly drilling into the sea floor is avoided. It is a much safer system than the air gun or ice saw system. The latter systems fracture or cut the ice and that can adversely affect its rigidity and strength. Several units mounted on one vehicle or one vessel will improve data quality due to its source array response. Further, consistently higher data quality should result in the use of this system over any system currently used to gather seismic data over the ice.

This data gathering seismic system provides a viable method of exploring areas where all efforts until now have been less than satisfactory. A direct couple between the sea bed and an energy source eliminates the undesirable currently associated with data quality in transition zone areas.

Although the present invention has been shown and illustrated in terms of specific method and apparatus, changes and modifications can be made without departing from the spirit and scope of the invention as defined by the appended claims.

I claim:

1. A method for generating a seismic signal in the earth at a location on the sea floor in the transition zone of a body of water, said method comprising the steps of:
   positioning a carrier on the surface of said body of water substantially directly above said location at which said seismic signal is to be generated;
   lowering an elongated, rigid coupler means from said carrier into contact with said sea floor, said rigid coupler means being sufficiently long to extend from said sea floor upwardly to said carrier on said surface of said body of water;
   supporting at least a portion of the weight of said carrier on said rigid coupler means so as to couple said rigid coupler means to said sea floor; and
   applying seismic energy to said rigid coupler means whereby said rigid coupler means transmits a seismic signal directly into the earth at said location on said sea floor.

2. The method of claim 1, said method further comprising the step of providing said rigid coupler means with a seismic energy source located at the lower end of said rigid coupler means when said rigid coupler means has been lowered into contact with said sea floor, said seismic energy source adapted to apply seismic energy to said rigid coupler means.

3. The method of claim 1, said method further comprising the steps of:
   providing said carrier with a seismic energy source; and
   connecting said seismic energy source to said rigid coupler means after said rigid coupler means has been lowered into contact with said sea floor.

4. The method of claim 1 wherein said body of water has a layer of ice formed on the surface thereof, and said method further comprises the steps of:
   drilling a hole through said layer of ice substantially directly above said location at which said seismic signal is to be generated; and
   positioning said carrier so that said rigid coupler means can be lowered through said hole and said body of water and into contact with said sea floor.

5. A method for generating a seismic signal in the earth at a location on the sea floor in the transition zone of a body of water, said body of water having a layer of ice formed on the surface thereof, said method comprising the steps of:
   drilling a plurality of holes through said layer of ice substantially directly above said location at which said seismic signal is to be generated;
   positioning a carrier on the surface of said layer of ice above said plurality of holes;
   lowering an elongated, rigid coupler means from said carrier through each said hole and said body of water and into contact with said sea floor, each said rigid coupler means being sufficiently long to extend from said sea floor upwardly to said carrier on said surface of said layer of ice;
   supporting at least a portion of the weight of said carrier on each said rigid coupler means so as to couple each said rigid coupler means to said sea floor; and
   applying seismic energy to each said rigid coupler means whereby a seismic signal is transmitted directly into the earth at said location.

6. The method of claim 5, said method further comprising the step of providing each said rigid coupler means with a seismic energy source located at the lower end of said rigid coupler means when said rigid coupler means has been lowered into contact with said sea floor, said seismic energy source adapted to apply seismic energy to said rigid coupler means.

7. The method of claim 5, said method further comprising the steps of:
   providing said carrier with a seismic energy source; and
   connecting each said rigid coupler means to said seismic energy source after said rigid coupler means has been lowered into contact with said sea floor.

8. An apparatus for generating a seismic signal in the earth at a location on the sea floor in the transition zone of a body of water, said apparatus comprising:
   a carrier located on the surface of said body of water;
   an elongated, rigid coupler means adapted to be lowered from said carrier through said body of water and into contact with said sea floor, said rigid coupler means being sufficiently long to extend from said sea floor upwardly to said carrier on the surface of said body of water;
   bias means attached to said carrier and said rigid coupler means and adapted to raise said carrier with respect to said rigid coupler means when said rigid coupler means has been lowered into contact with said sea floor so that at least a portion of the weight of said carrier may be supported on said rigid coupler means to bias said rigid coupler means against said sea floor; and
   a seismic energy source adapted to apply seismic energy to said rigid coupler means.

9. The apparatus of claim 8 wherein said seismic energy source is located at the lower end of said rigid coupler means when said rigid coupler means has been lowered into contact with said sea floor.

10. The apparatus of claim 8 wherein said seismic energy source is located on said carrier and is adapted to be connected to said rigid coupler means after said coupler means has been lowered into contact with said sea floor.

11. The apparatus of claim 8 wherein said apparatus further comprises a base plate attached to the lower end of said rigid coupler means, said base plate adapted to contact said sea floor when said rigid coupler means has been lowered into contact with said sea floor.

12. The apparatus of claim 8 wherein said body of water has a layer of ice formed on the surface thereof, and wherein said apparatus further comprises means for drilling a hole through said layer of ice, said rigid coupler means adapted to be lowered through said hole and said body of water and into contact with said sea floor.

13. The apparatus of claim 12 wherein said apparatus further comprises a base plate assembly attached to the lower end of said rigid coupler means, said base plate assembly comprising:
   a plurality of appendages adapted to be retracted while said rigid coupler means is being lowered through said hole in said layer of ice and to be extended when said rigid coupler is in contact with said sea floor to expand the area of contact between said rigid coupler means and said sea floor; and
   means for extending and retracting said appendages.

* * * * *